United States Patent
Murray et al.

(10) Patent No.: US 7,644,285 B1
(45) Date of Patent: Jan. 5, 2010

(54) RECOVERY ACCESS TO SECURE DATA

(75) Inventors: Calum Murray, Petaluma, CA (US);
Jeff Mendonca, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 526 days.

(21) Appl. No.: 10/821,774

(22) Filed: Apr. 8, 2004

(51) Int. Cl.
*H04L 29/06* (2006.01)
*H04L 9/32* (2006.01)
*H04L 9/08* (2006.01)
*G06F 21/00* (2006.01)
*G06F 7/04* (2006.01)
*G06F 12/00* (2006.01)
*G06F 7/00* (2006.01)
*G06F 17/30* (2006.01)
*B41K 3/38* (2006.01)

(52) U.S. Cl. .................. 713/183; 713/155; 713/168; 726/2; 380/59; 380/285; 707/9; 707/202

(58) Field of Classification Search .................. 713/183
See application file for complete search history.

(56) References Cited

U.S. PATENT DOCUMENTS

| | | | | |
|---|---|---|---|---|
| 5,418,854 A * | 5/1995 | Kaufman et al. | ............ | 713/156 |
| 5,592,553 A * | 1/1997 | Guski et al. | .................. | 713/159 |
| 5,734,718 A * | 3/1998 | Prafullchandra | ............ | 713/183 |
| 5,774,650 A * | 6/1998 | Chapman et al. | .............. | 726/7 |
| 5,778,395 A * | 7/1998 | Whiting et al. | ............. | 707/204 |
| 6,185,308 B1 * | 2/2001 | Ando et al. | .................. | 380/286 |
| 6,246,771 B1 * | 6/2001 | Stanton et al. | .............. | 380/286 |
| 6,282,295 B1 * | 8/2001 | Young et al. | ................. | 380/286 |
| 2001/0055388 A1 * | 12/2001 | Kaliski, Jr. | .................... | 380/30 |
| 2003/0035548 A1 * | 2/2003 | Kwan | .......................... | 380/286 |

OTHER PUBLICATIONS

Lampson et al, "Authentication in distributed systems: theory and practice," 1991, ACM Press New York, NY, USA, ACM Symposium on Operating Systems Principles, Proceedings of the thirteenth ACM symposium on Operating systems principles, pp. 165-182.*
Jeremy Allison, "pwdump—Windows NT password hash retrieval," Mar. 22, 1997, insecure.org, http://insecure.org/sploits/WinNT.passwordhashes.deobfuscation.html.*
"pwdump—Windows NT password hash retrieval," Jeremy Allison, insecure.org, Mar. 22, 1997, http://insecure.org/sploits/WinNT.passwordhashes.deobfuscation.html.*
Information page, "Adaptive Server Anywhere SQL Reference Manual" [online], Oct. 2002, MSIT Store [retrieved on Sep. 24, 2004]. Retrieved from MSIT Online Store.
-ec server option, "Adaptive Server Anywhere Database Administration Guide 5. The Database Server" [online], Oct. 2002, MSIT Store [retrieved on Sep. 24, 2004]. Retrieved from MSIT Online Store.

* cited by examiner

*Primary Examiner*—Nasser G Moazzami
*Assistant Examiner*—Oscar A Louie
(74) *Attorney, Agent, or Firm*—Osha • Liang LLP

(57) ABSTRACT

A security mechanism affords data recovery engineers the ability to access and recover secure data from user files without knowledge of the user's password. The mechanism uses a launcher application to access the database by establishing a temporary, restricted user session. The launcher application also passes a handle to an industry standard database tool, allowing the data recovery engineer to recover the user file data. The recovered data then can be accessed by the software application.

8 Claims, 2 Drawing Sheets

RECOVERY ACCESS TO SECURE DATA

FIELD OF THE INVENTION

This invention relates to security features in computer systems, in particular to access to and recovery of secure data.

BACKGROUND

In software application environments users typically rely on software applications to prevent unauthorized access to files of stored data through the use of user names and passwords. A software application may protect the data by relying on a data storage system that in turn requires authentication via user name and password. Often, user passwords are the only commercially viable means to protect such data. To prevent memorizing multiple passwords, users also may reuse passwords for various applications and systems. In some cases, a user may have a global password for all their applications and services requiring one. And in some cases, software applications may not maintain distinct users and passwords for the data storage system and instead rely on a global user name and password to protect the data by providing an application identifier as user name and a fixed password to the data storage system. However, the use of a global user name and password on the data storage opens up the possibility of systemic attack against the database. On the contrary, having no global database password provides increased security but presents a challenge to data recovery.

From time to time, users may want to recover various data from their files, creating a need for data recovery engineers to access user information stored in a database. In such situations, a user may tell a data recovery engineer the user's user name and password so that the user's files may be accessed. However, giving this password to the data recovery engineer presents a security issue because it lets the data recovery engineer assume the identity of that user not only for the file to be recovered but also for any other services or software applications for which that user and password are valid. Even if data recovery engineers' access is restricted, such direct access to the user's file provides an opportunity for engineers to look for ways to change their access by taking advantage of code defects in the data storage system. In addition, the data that users often want to recover is a forgotten password. In this case, the user would have no way to provide the data recovery engineer access to the user files through the above method to perform data recovery.

Another approach to data recovery engineer access is through the use of public key encryption. In this example, the user password is initially encrypted with the software vendor's public key. The data recovery engineer would then use the software vendor's private key to decrypt the data and access the user's file to perform data recovery. In addition to identify fraud issues mentioned above, providing data recovery engineers the private key exposes the private key, raising other potential systemic security failure modes. In addition, this approach still exposes the entire database to the data recovery engineer, thereby compromising the privacy of the user's information.

The industry standard for data storage is a relational database operating on an open database connectivity (ODBC) model. However, the use of a database server that listens on an open TCP port reduces the security of user files by providing an opportunity for remote anonymous attackers to access or damage user data within files.

Accordingly, there is a need to provide a system and method for recovery of secure user file data that allows data recovery engineers access to user files on the database without an open connection and without exposing either the user's password or the software vendor's private key.

SUMMARY OF THE INVENTION

The present invention provides a security mechanism that affords data recovery engineers the ability to access and recover secure data from user files without knowledge of the user's password. To provide this access, an embedded mechanism within the database allows a launcher to mediate access to the database by gathering just enough information to establish a direct connection to the database as the user and create a temporary restricted database user for use by the data recovery engineer. This mechanism enables a data recovery process while maintaining increased security. There is no global user/password that would be susceptible to systemic attack. The mechanism for gathering information on the user offers improved security by allowing user file access without an open connection to the database through which attackers might gain access to a user's files. In addition, because the database password is derived from the user's application password, at no time can a data recovery engineer ever gain access to a piece of data within the database file that could exploit a different service or application protected by the user's common password.

To provide the data recovery engineer access to a user's file, a user initially accesses a software application and establishes a username and password. The application creates a hash of the user name and password, which is then encrypted with a public key and saved. The public key is typically provided by the software vendor, and corresponds to a private key of the software vendor (which may have multiple public-private key pairs). The hash, rather than the user password, then becomes the database password. A separate password is created for each user file.

When a user contacts a data recovery engineer to recover data from the user's files, the user is not required to provide the data recovery engineer the user's password. The user provides the data recovery engineer with the database file to which the user desires access. The data recovery engineer initiates a launcher application. The launcher application initiates an attempted signon with a known user that is programmatically designed to fail to connect; the database recognizes the failed connection attempt and in response triggers an embedded mechanism that dumps the user name and encrypted hash of the user name and password into a separate file. The launcher application then accesses this file and reads the user name and encrypted hash. The launcher application decrypts the hash using the vendor's private key and uses that to connect to the database and create a temporary user with restricted access. It then initiates a temporary session using this temporary database user name and password. Thus, the security of the user's password is increased because the password is never exposed to the data recovery engineer, since only the decrypted hash is obtained. Further, the secrecy of the vendor's private key is maintained because the data recovery engineer does not have access to the private key, which is contained within the launcher. However, because the launcher application allows a temporary user session, the data recovery engineer can access data from the user file, in a restricted fashion. The launcher application also passes a handle to an industry standard database tool, allowing the data recovery engineer to use the tool to access the user file data.

In accordance with the present invention, there is provided a computer program product and method that allows accessibility to secure data from a client database without compromising the secrecy of the client's password or other data. The computer program product comprises various computer modules stored on a computer readable medium.

A first executable module writes a dumped file from data in a database, the dumped file containing a user name for the database and its public key encrypted database password. Another executable module decrypts the public key encrypted database password using a private key. The decrypted database password comprises a hash of a client user name and password. A third module initiates a temporary user session with the database using the decrypted database password.

In one embodiment, an additional module is responsible for a preliminary step that produces the dumped file. The additional module attempts to sign on to the database using a signon that the database recognizes as defective, causing the signon to fail. As a result of the failed signon, an attempted signon logic creates the dumped file.

In one embodiment, an additional module passes a connect string containing the database password to a database tool, allowing the tool access to the database.

The method comprises the communication of various data between elements of the system. In one embodiment a launcher application attempts to signon to a database, but the attempt fails and in response the database dumps a file. Next, regardless of how the launcher gets access to the file, the launcher reads the dumped file, which is accessible by the launcher without signing on. The file contains the user name and a public key encrypted database password, which is a hash of the user name and password.

The launcher decrypts the database password using a private key corresponding to the public key with which the database password was encrypted. Using this password, the launcher then signs on to the database as the user. Once it has access to the data storage system, the launcher creates a temporary restricted user. When the temporary user has been created, the launcher passes a connect string to a database tool to allow the tool to access the database. Additional steps include the database tool querying the database, receiving data, processing the data for recovery, and making the recovered data available to a user's software application.

DETAILED DESCRIPTION OF THE EMBODIMENTS

System Architecture

Figure 1:
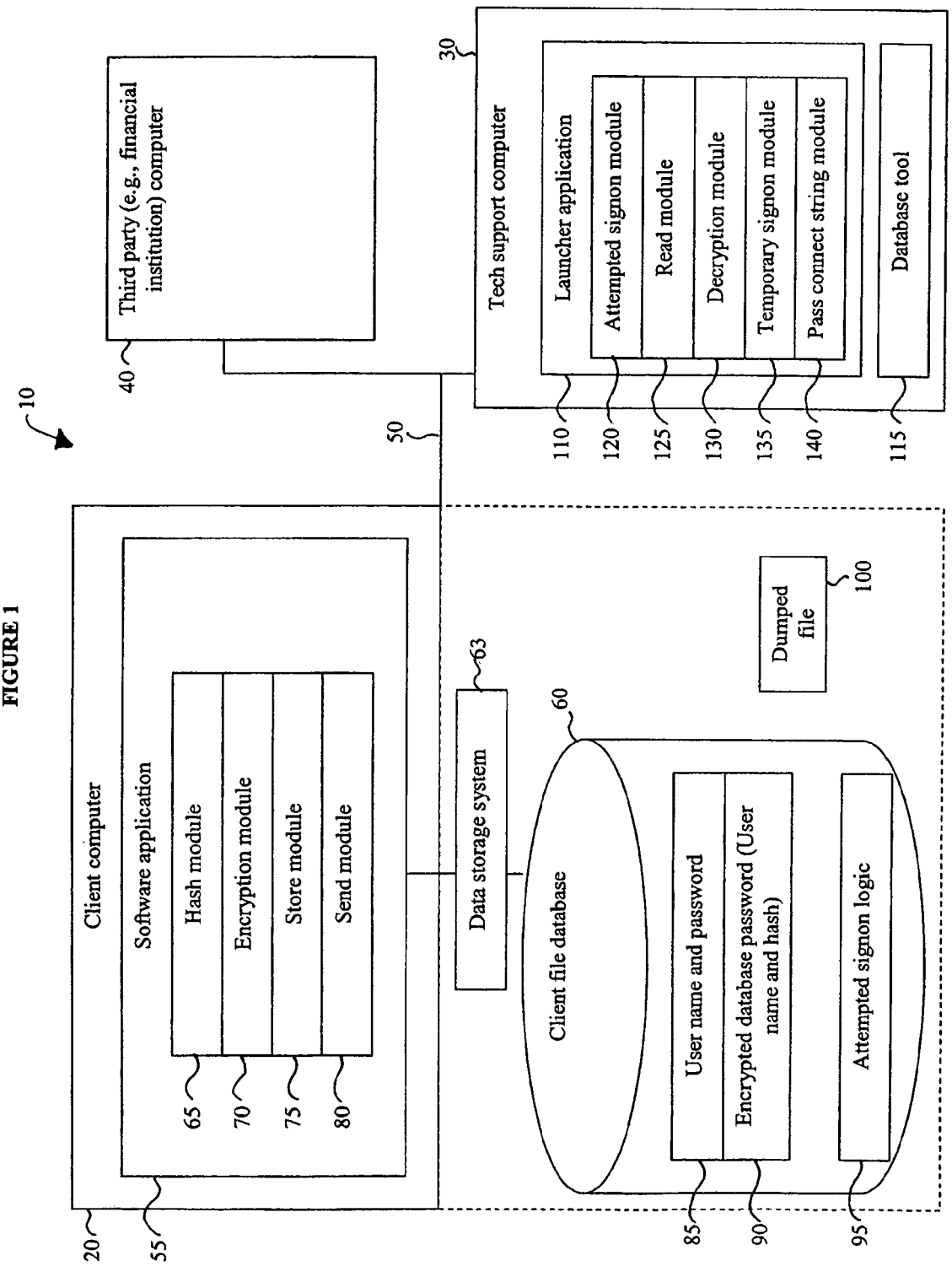
FIG. 1 is an illustration of the architecture of a system useful for providing recovery access to secure data in accordance with one embodiment of the present invention.

Referring now to FIG. 1, there is shown an illustration of the architecture of a system 10 useful for providing recovery access to secure data in accordance with one embodiment of the present invention. In such a system 10, there is provided a client computer 20, a tech support computer 30, optionally, a third party computer 40 (e.g., a financial institution), and a network 50 for communicatively coupling the computers 20-40.

A client computer 20 is of conventional design, and includes a processor, an addressable memory, and other conventional features (not illustrated) such as a display, a local hard disk, input/output ports, and a network interface. The network interface and a network communication protocol provide access to the network 50 and other computers, such as tech support computers 30 or financial institution computers 40, along with access to the Internet, via a TCP-IP type connection, or to other network embodiments, such as a WAN, LAN, MAN, or the like. In the preferred embodiment the client computer 20 may be implemented on an Intel-based computer operating under Microsoft Windows XP, Windows 2000, or Windows NT operating system, or a SPARC-based computer operating under UNIX, or any other equivalent devices.

A tech support computer 30 also is a conventional computer, providing transactions processing and clearing functionality for the client application. A tech support computer 30 may have a network interface and a network communication protocol provide access to the network 50 and other computers.

The third party computer 40 also is a conventional computer system, providing application processing or services to the client computer. In one embodiment, the third party computer is hosted by a financial institution, and provides transactions processing and clearing functionality for the client applications. A financial institution computer 40 may have a network interface and a network communication protocol provide access to the network 50 and other computers. One or more of the financial institutions may operate as a clearinghouse to provide transaction processing of banking transactions on behalf of the other financial institutions. In addition the user typically will have one or more accounts established with a financial institution, and the software application 55 of a client computer 20 will communicate with the financial institution computer 40 to access account information (e.g., obtain account balances to determine available funds), and provide payment instructions for making payments to vendors.

A network 50 is the Internet, or other embodiments such as WAN, LAN, MAN or the like, capable of connecting computer systems to each other.

A client computer 20 further comprises a software application 55. In one embodiment, the client computer 20 also comprises a client file database 60, a data storage system 63, and a dumped file 100. For this embodiment, FIG. 1 shows a dotted line for the outline of the client computer 20. In other embodiments, the client file database 60, data storage system 63, and dumped file 100 may be external to the client computer 20 (computer 20 does not extend to dotted line portion). In either scenario, the dumped file 100 will reside with the client file database 60.

In accordance with the present invention, a client computer 20 executes a software application 55 comprised of a number of executable code portions and data files. These include code for creating and supporting the software application 55 functionality. A software application 55 is adapted to communicate over a network 50. It also may be adapted to communicate over a network 50 to a financial institution computer 40 to obtain account information for a user's financial account(s).

The software application 55 may be provided to the client computer 20 on a computer readable media, such as a CD-ROM, diskette, or by electronic communication over the network 50 from one of the financial institution computers 40 or other distributors of software, for installation and execution thereon. In another example, the software application 55, client file database 60, and data storage system 63 can be hosted on a server computer (not shown), and accessed over the network 50 by the client, using for example a browser interface to the software application 55.

In accordance with one example, the client computer 20 maintains a client file database 60 for storing information relating to various aspects of software application 55 execution, for example storage of data input by a client user. This example is shown in FIG. 1, in which the client computer encompasses the additional area surrounded by the dotted line. The database 60 may be a conventional database accessible by the application 55 through a user interface. The application 55 accesses and queries the database 60 to retrieve data records associated with the software application 55.

In one embodiment, the client computer 20 comprises a data storage system 63. The data storage system 63 enables the user to store, modify, and extract information from data storage. In one embodiment, the data storage system 63 is a standard database management system.

In one embodiment, the client computer 20 comprises a dumped file 100. The dumped file 100 is accessible by the launcher application 110 and contains information extracted from the client file database 60, including an encrypted database password 90 as will be described in further detail below in conjunction with the attempted signon logic 95.

In one embodiment, the software application 55 further comprises a hash module 65, an encryption module 70, a store module 75, and a send module 80. A hash module 65 executes an application logic to control a processor to hash a user name and password 85. Hashing is a one-way operation that generates from the bits of a message a fixed-size hash value in such a way that it is impossible to generate the original message from the hash. Well-known message digest or cryptographic hash functions include MD2, MD4, MD5, and SHA-1. The software application 55 also comprises an encryption module 70, which executes a store function to control a processor to encrypt the hash of the user name and password. In one embodiment, the encryption is accomplished using a public key encryption algorithm. The public key/private key pair is provided by the software vendor (which may have numerous such pairs). The public key is embedded in the software application 55 and the private key is kept under strict control by the software vendor.

In accordance with this example, the application 55 comprises a store module 75, which executes a trigger in the data store to control a processor to store into memory various data items such as the user name and password 85 and the encrypted hashed user name and password 90. In addition, a send module executes 80 an application logic to control a processor to send the encrypted and hashed user name and password to a launcher application 110. This feature increases the security of the user's password since the launcher application 110 accesses the hash of the password, never the password itself. In addition, while the launcher 110 has knowledge of the hash of the password, the database password is not exposed to the data recovery engineer, further enhancing system security.

The client file database 60 further comprises tables stored in memory and/or on disk. In one embodiment, the files include a user name and password table 85, a user name and hash table 90, and an attempted signon logic 95.

A user name and password table 85 is a file stored in memory including the client's user name and password. This file is accessed by the data storage system 63 on behalf of the software application 55 when the client attempts to log in to the software application 55. In addition, the user name and password table 85 includes an executable process for allowing a temporary user signon to the database 60. The temporary signon has restricted access to the database 60 files, and in one embodiment, may be limited to retrieval of certain client data by a database tool 115.

A user name and hash table 90 stores the client's user name and a hash of the client's user name and password, the combination being the necessary user name and password to access the database 60. An attempted signon logic 95 is a stored procedure that dumps the encrypted database password 90 into a dumped file 100 when a signon attempt is made using a specific defective user name and password.

A tech support computer 30 further comprises a launcher application 110 and an industry standard database tool 115. In accordance with one embodiment of the present invention, a tech support computer 20 executes a launcher application 110. The launcher application 110 in its most basic form is an application used to select and start other applications. The launcher application 110 is comprised of a number of executable code portions and data files. These include code for creating and supporting the launcher application 110 and associated functionality.

In accordance with this example, a launcher application 110 executes a database tool 115. In its most basic form, a database tool 115 allows access to data in a database, e.g., the client file database 60. In one embodiment, the database tool 115 is an open database connectivity compatible (ODBC) tool, which is a standard database access protocol that allows access to any data from any application regardless of which DBMS is managing the data. In this example, the launcher application 110 passes the database tool 115 a connect string including the database password 90 in decrypted form. The use of a launcher application 110 is advantageous because it provides a method to connect to a database without the user of the launcher application 110 knowing the database password. Instead, only the launcher application 110 has access to this information.

In one embodiment, the launcher application 110 further comprises an attempted signon module 120, a read module 125, a decryption module 130, a temporary signon module 135, and a pass connect string module 140.

The attempted signon module 120 executes a process using a specified signon that attempts a connection to the client file database 60 that programmably fails to connect. This attempted signon 120 activates the attempted signon logic 95 described above. The launcher application also includes a read module 125. The read module 125 executes a set of instructions to enable the launcher application 110 to read the dumped file 100. In accordance with the present invention, a decryption module 130 of the launcher application 110 decrypts the database password contained in the dumped file 110. In one embodiment, the decryption is accomplished using public key encryption, using the software vendor's private key. This aspect of the invention is advantageous because the launcher application 110 user, a data recovery engineer, never has access to the private key used by the launcher application 110.

In accordance with this example, the launcher application 110 contains a temporary signon module 135, which signs on as the user to create a temporary user with restricted access rights in the database 60. The restricted access rights further protect the security of the user's data as they only allow access to particular predefined data and functions. Then the temporary signon module 135 executes a set of instructions to enable the launcher to signon to the database 60 as temporary user. Finally, a pass connect string module 140 executes a process for the launcher application 110 to pass a connect string including the database password 90 in unencrypted form to the database tool 115. As a result of these functions, the launcher application 110 can access the database 60 without the user of the launcher 110 having knowledge of the user's password or software vendor's private key.

Secure Data Recovery Workflow

Figure 2:
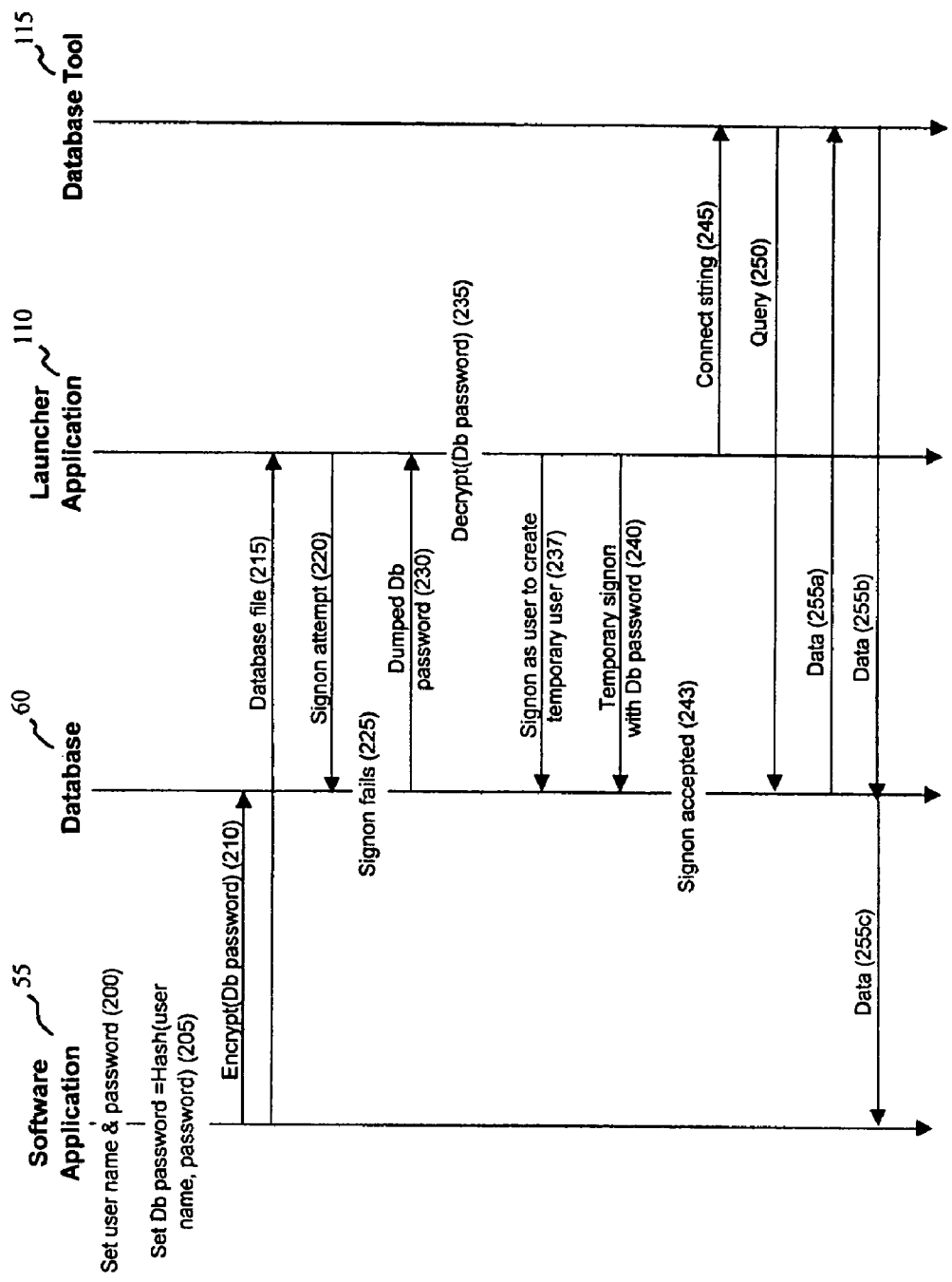
FIG. 2 is an interaction diagram illustrating how data is passed between the various elements of a security mechanism for recovering secure data in accordance with one embodiment of the present invention.

Referring now to FIG. 2, there is shown an interaction diagram illustrating how data is passed between the various elements of a security mechanism for recovering secure data in accordance with one embodiment of the present invention.

According to one embodiment of the present invention, the process begins by the software application 55 setting the user name and password 200 in response to entry of the user name and password by a client user and storing it to memory. Next, the software application 55 sets database password 205, which is accomplished by taking a one way hash of the user name and password, and storing it to memory. The software application 55 then encrypts the database password and sends 210 it to the database 60 for storage in the database 60.

At some point, the user needs to recover data or access to the user file. For example, if the user file has become corrupted and needs to be repaired. The user of the software application sends the database file 215 to a data recovery engineer. The engineer executes the launcher application 110, and uses it to initiate a signon attempt 220 to the database 60. The database 60 recognizes the attempted signon as defective signon and fails the signon 225. In addition, an embedded process within the database 60 is triggered by the failed signon attempt 225, causing the database 60 to dump the file 230 containing the database password in encrypted form. This file is then read by the launcher application 110 to extract the encrypted password and the user's name.

Next, the launcher application 110 decrypts the encrypted database password 235. In one embodiment, the decryption is accomplished using public key encryption, using the software vendor's private key. The launcher application 110 then signs on 237 as the user to create a temporary user with restricted access rights. The launcher application 110 then launches a temporary signon 240 to the database 60 using the temporary database password and the user's name. The database accepts 243 the signon as successful. In addition, the launcher application 110 sends a connect string 245 to an industry standard database tool 115, including the database password and the user's name. The industry standard database tool 115 allows access to the database using industry standard querying mechanisms 250. The database tool 115 can then read from 225a and write to 255b the database 60, which the software application 55 can access to receive the data.

The above example uses an attempted signon 220 that triggers a dumped file to provide the launcher 110 the encrypted database password. However, the present invention comprises other methods of the launcher application 110 obtaining this information. For example, in other embodiments, the launcher application 110 could read the password from the database 60 file header; the launcher application 110 could read the password from a known offset into the file; the launcher 110 could use a pattern match for a key in the file, and read the password from there; the launcher 110 could retrieve the password from online storage; or the launcher 110 could have access to a separate file with the database password without having to go through the attempted signon.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), erasable programmable read only memories (EPROMs), electrically erasable programmable read only memories (EEPROMs), magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer readable medium storing computer executable instructions for connecting to a database, the computer executable instructions comprising functionality to perform the operations of:

receiving, at a launcher application, a request from a user to obtain a file from the database, wherein the database is accessed by a software application, wherein the user logs in to the software application using a user name and a user password, wherein the software application signs on to the database using the user name and a database password, and wherein the database password comprises a hash of the user name and the user password;

obtaining, at the launcher application and in response to the request, a file dump associated with the database and comprising an encrypted database password, wherein the encrypted database password is the database password encrypted using a public encryption key provided by a vendor of the software application, and wherein the encrypted database password is generated by the software application before receiving the request;

decrypting, by the launcher application, the encrypted database password using a private key stored in the launcher application to obtain the database password, wherein the private key is provided by the vendor and stored in the launcher application before receiving the request;

signing on to the database, using the launcher application, with the user name and the database password to obtain a temporary user name, wherein the user name has access to a set of data and functions in the database, wherein the temporary user name is restricted to a subset of the set of data and functions, and wherein the subset has less data and fewer functions than the set;

signing on to the database, using the launcher application, with the temporary user name and the database password;

sending a connect string including the database password and the temporary user name to a database tool; and accessing the database, using the database tool, to obtain the file stored in the database, wherein the database tool is separate from the launcher application, and wherein the launcher application and the software application execute on different computers.

2. The computer readable medium of claim 1, the computer executable instructions comprising functionality to perform the operations of:

initiating, using the launcher application after receiving the request from the user, a signon attempt to the database with a defective signon, wherein the database generates the file dump in response to the signon attempt.

3. A system to connect to a database, comprising:

a processor;

an attempted signon module executing on the processor and configured to initiate a signon attempt to the database using a defective signon, wherein the database sends a file dump in response to the signon attempt;

a read module executing on the processor and configured to read an encrypted version of a database password in the file dump, wherein the database password comprises a hash of a user name and a password associated with a user, wherein the user name and the password are used to log in to a software application, and wherein the software application signs on to the database using the user name and the database password;

a decryption module executing on the processor and configured to decrypt the encrypted version of the database password using a private key provided by a vendor of the software application to obtain the database password, wherein the database password is encrypted using a public key provided by the vendor before the signon attempt;

a temporary signon module executing on the processor and configured to signon to the database using the user name and the database password to obtain a temporary user name, and then signon to the database using the temporary user name and the database password, wherein the user name has access to a set of data and functions in the database, wherein the temporary user name is restricted to a subset of the set of data and functions, wherein the subset has less data and fewer functions than the set; and a pass connect string module executing on the processor and configured to pass a connect string comprising the database password to a database tool, wherein the database tool, upon receipt of the connect string, requests a file stored in the database and receives the file, and wherein the temporary signon module and the software application execute on different computers.

4. A method of controlling a processor to connect to a database, the method comprising:

receiving, at a launcher application, a request from a user to obtain a file stored in the database, wherein the database is accessed by a software application, wherein the user logs in to the software application using a user name and a user password, wherein the software application signs on to the database using the user name and a database password, and wherein the database password comprises a hash of the user name and the user password;

obtaining, at the launcher application and in response to the request, a file dump associated with the database and comprising an encrypted database password, wherein the encrypted database password is the database password encrypted using a public encryption key provided by a vendor of the software application, and wherein the encrypted database password is generated by the software application before receiving the request;

decrypting, by the launcher application, the encrypted database password using a private key stored in the launcher application to obtain the database password, wherein the private key is provided by the vendor and stored in the launcher application before receiving the request;

signing on to the database, using the launcher application, with the user name and the database password to create a temporary user name, wherein the user name has access to a set of data and functions in the database, wherein the temporary user name is restricted to a subset of the set of data and functions, and wherein the subset has less data and fewer functions than the set;

signing on to the database, using the launcher application, with the temporary user name and the database password;

sending a connect string including the database password and the temporary user name and the database password to a database tool; and accessing the database, using the database tool, to obtain the file stored in the database, wherein the database tool is separate from the launcher application, and wherein the launcher application and the software application execute on different computers.

5. The method of claim 4, further comprising:
initiating, using the launcher application after receiving the request from the user, a signon attempt to the database with a defective signon,
wherein the database generates the file dump in response to the signon attempt.

6. A computer readable medium storing computer executable instructions for connecting to a database, the computer executable instructions comprising functionality to perform the operations of:
obtaining a user name and a password of a user for logging in to a software application;
creating a database password by hashing the user name and the password, wherein the software application signs on to the database using the user name and the password;
encrypting the database password using a public encryption key provided by a vendor of the software application to create an encrypted database password;
storing the encrypted database password in the database;
receiving, from a launcher application, a signon attempt for the database, wherein the signon attempt fails;
creating a file dump comprising the encrypted password in response to the failed signon attempt;
sending the file dump to the launcher application, wherein the launcher application obtains the database password by decrypting the encrypted database password using a private key provided by the vendor and stored within the launcher application;
generating a temporary user name based on the user name, wherein the user name has access to a set of data and functions in the database, wherein the temporary user name is restricted to a subset of the set of data and functions, and wherein the subset has less data and fewer functions than the set;
granting a request from the launcher application to signon to the database using the temporary user name and the database password;
receiving a request from a database tool for a file stored in the database, wherein the launcher application sends the temporary user name and the database password to the database tool; and
sending the file stored in the database to the database tool, wherein the launcher application and the software application execute on different computers.

7. A system to connect to a database, comprising:
a processor;
a hash module executing on the processor and configured to hash a user name and a password to create a database password, wherein the user name and the password are used to log in to a software application, and wherein the user name and the database password are used to signon to the database;
an encryption module executing on the processor and configured to create an encrypted version of the database password using a public key provided by a vendor of the software application;
a store module executing on the processor and configured to store the encrypted database password in the database; and
a send module configured to send the encrypted database password file to a launcher application in a file dump, wherein the launcher application decrypts the encrypted version of the database password using a private key provided by the software vendor and stored in the launcher application,
wherein the database generates a temporary user name for the launcher application, wherein the temporary user name has access to less data and fewer functions in the database than the user name,
wherein the database grants a request from the launcher application to signon to the database using the temporary user name and the database password, and
wherein the database sends the file stored in the database to a database tool associated with the launcher application in response to a query for the file from the database tool.

8. A method of controlling a processor to connect to a database and a launcher application, the method comprising:
obtaining a user name and a password of a user for logging in to a software application;
creating a database password by hashing the user name and the password, wherein the software application signs on to the database using the user name and the password;
encrypting the database password using a public encryption key provided by a vendor of the software application to create an encrypted database password;
storing the encrypted database password in the database;
receiving, from a launcher application, a signon attempt for the database after storing the encrypted database password in the database, wherein the signon attempt fails;
creating a file dump comprising the encrypted password in response to the failed signon attempt;
sending the file dump to the launcher application, wherein the launcher application obtains the database password by decrypting the encrypted database password using a private key provided by the vendor and stored within the launcher application;
generating a temporary user name based on the user name, wherein the user name has access to a set of data and functions in the database, wherein the temporary user name is restricted to a subset of the set of data and functions, and wherein the subset has less data and fewer functions than the set;
granting a request from the launcher application to signon to the database using the temporary user name and the database password;
receiving a request from a database tool for a file stored in the database, wherein the launcher application sends the temporary user name and the database password to the database tool; and
sending the file stored in the database to the database tool, wherein the launcher application and the software application execute on difference computers.

* * * * *